(12) United States Patent
Coenraadts

(10) Patent No.: US 10,051,999 B2
(45) Date of Patent: Aug. 21, 2018

(54) APPARATUS FOR BREAKING EGGS AND METHOD FOR CLEANING

(71) Applicant: Moba Group B.V., Barneveld (NL)

(72) Inventor: Jacobus Willem Karel Coenraadts, Oostzaan (NL)

(73) Assignee: MOBA GROUP B.V., Ve Barneveld (NL)

( * ) Notice: Subject to any disclaimer, the term of this patent is extended or adjusted under 35 U.S.C. 154(b) by 696 days.

(21) Appl. No.: 14/423,308

(22) PCT Filed: Aug. 23, 2013

(86) PCT No.: PCT/NL2013/050610
§ 371 (c)(1),
(2) Date: Feb. 23, 2015

(87) PCT Pub. No.: WO2014/030999
PCT Pub. Date: Feb. 27, 2014

(65) Prior Publication Data
US 2015/0223641 A1 Aug. 13, 2015

(30) Foreign Application Priority Data

Aug. 23, 2012 (EP) ..................................... 12006013

(51) Int. Cl.
*A47J 43/14* (2006.01)
*B08B 3/02* (2006.01)
*B08B 3/04* (2006.01)

(52) U.S. Cl.
CPC ............... *A47J 43/145* (2013.01); *B08B 3/02* (2013.01); *B08B 3/041* (2013.01)

(58) Field of Classification Search
None
See application file for complete search history.

(56) References Cited

U.S. PATENT DOCUMENTS 2,815,055 A 12/1957 Willsey
5,617,782 A 4/1997 Thomas
(Continued)

OTHER PUBLICATIONS

International Search Report & Written Opinion of the International Searching Authority for PCT/NL2013/050610 dated Oct. 2, 2013.

*Primary Examiner* — Eric W Golightly
*Assistant Examiner* — Arlyn I Rivera-Cordero
(74) *Attorney, Agent, or Firm* — Marvin Petry; Stites & Harbison, PLLC

(57) ABSTRACT

An apparatus and method for breaking eggs and separating egg liquids thus obtained. A first supply unit supplies a plurality of first rows of eggs to a second unit having a first endless conveyor and a plurality of corresponding second rows of egg breaker units. Eggs are transferred one by one from the first conveyor to a second conveyor which has a plurality of corresponding third rows of egg liquid containing cups with a part underneath the first conveyor for liquids transferred from the first conveyor to the second conveyor. A row of egg part receptacles are under the cups for collecting liquids. A cleaning section for the cups has a liquid washing head to clean and wash the cups and receptacles with a substantially downward cleaning flow. A liquid receiver gutter between the rows of receptacles and the second conveyor moves between a first position to clean at least the cups wherein the receiving gutter protects the flow of receptacles from leaking cleaning liquid during breaking and separating, and a second position for cleaning at least the cups and at least one of the receptacles wherein the receiver gutter protects the remaining receptacles from leaking and cleaning liquid during breaking and separating.

13 Claims, 1 Drawing Sheet

(56) References Cited

Figure 1:
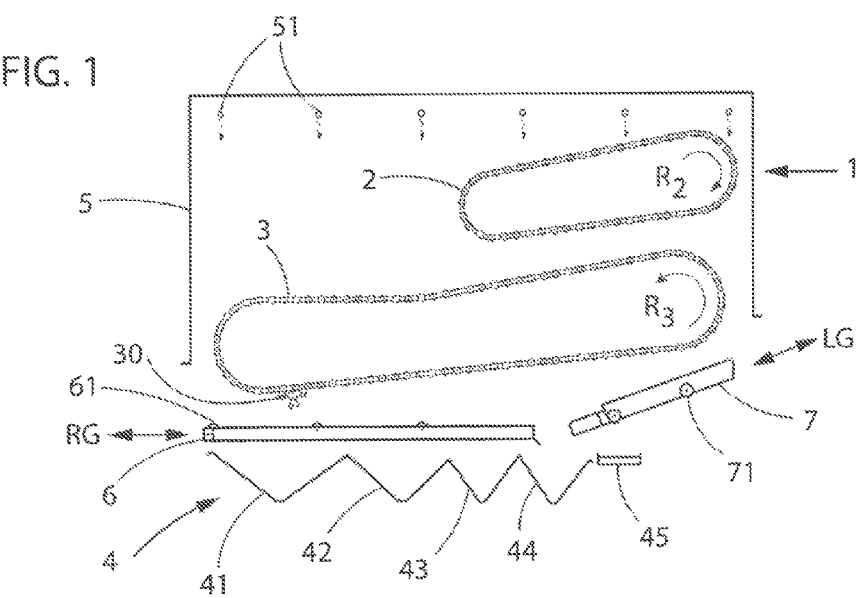

U.S. PATENT DOCUMENTS 5,628,246 A 5/1997 Kristensen
2008/0292758 A1 11/2008 Kristensen et al.

APPARATUS FOR BREAKING EGGS AND METHOD FOR CLEANING

FIELD OF THE INVENTION

The present invention concerns an apparatus for breaking eggs and separating egg liquids thus obtained.

BACKGROUND OF THE INVENTION

Such apparatus is known for example from EP1850721.

In this document in particular the process of monitoring and controlling of breaking has been described wherein supply of eggs and transfer of said eggs to breaking units is explained.

After breaking the egg liquid components or egg liquid products, i.e. egg white and egg yolk, are received in corresponding cups. From said cups said products are collected in corresponding receptacles. In EP 1850721 such receptacles collect said product in the sequence of firstly egg white or albumen, secondly egg yolk, thirdly mixtures of yolk and albumen, and contamination and unacceptable egg product in the latter one.

Monitoring of the content of the cups and thus control of release of their content into the respective receptacles is elucidated in detail.

Besides a washer or disinfector is disclosed for washing or disinfecting cups after emptying. Said washer or disinfector is arranged in the conveyor path downstream of said receptacles in order to avoid any contamination during washing or disinfecting.

Simultaneous washing or disinfecting both cups and receptacles is not possible.

SUMMARY OF THE INVENTION

In order to overcome such disadvantage the apparatus in accordance with the present invention is characterized in that,
said cleaning section further comprises,
a liquid washer head in order to clean and wash at least said cups and said receptacles with a substantially downward cleaning liquid flow,
a liquid receiver gutter at a height between said row of receptacles and said third conveyor and wherein said gutter can move between at least,
a first position or a cleaning position for cleaning at least said cups wherein said receiver gutter is protecting said row of receptacles from leaking said cleaning liquid during said breaking and said separating, and
a second position or intermediate position for cleaning at least said cups and at least one of said receptacles wherein said receiver gutter is protecting the according remaining receptacles from leaking said cleaning liquid during said breaking and separating, and
a control unit for controlling at least movements of said receiver gutter.

Having the cleaning section in accordance with the present invention, more in particular having such receiver gutter, it has appeared to have the advantage of substantially reducing cleaning time of such apparatus. Such advantage must be considered more than a normal or average advantage since such apparatus, more in particular such cleaning section built in between such conveyor is very difficult to enter and to consequently clean. Usually different operators have to carry out such task, both during working hours and thus during a stop, and after daily operations of such apparatus as well.

Moreover, the present invention enables to clean more frequently, and efficiently. Consequently the hygienic situation can be improved substantially, by having on time average a significantly cleaner apparatus, and having less sticking residual matter.

As a further advantage, by having a cleaner apparatus consequently less detergent can suffice to reach a desired washing result.

Also, with great advantage, at least part of the apparatus can be cleaned during operation while protecting said (preferably all) egg liquid receiving receptacles against leaking cleaning fluid or liquid.

Further embodiments of the apparatus of the present invention are characterized by one or more of the following features:
said washer head comprises a plurality of cleaning liquid supply elements wherein said supply elements are powered by said control unit;
said receiver gutter is moveable substantially horizontally;
said second conveyor is an endless conveyor having the cups underneath when releasing said liquids;
said receiver gutter has a direction of moving from said first position to said second position which is the downstream direction of the third conveyor;
said apparatus further comprises a further downstream washing liquid receptacle for catching and receiving washing liquid after washing with said downward flow when washing at least said third conveyor at its downstream side;
said apparatus further comprises a further downstream egg leakage liquid receptacle for collecting egg leakage liquid leaking downwardly from at least a corresponding end section of one of said conveyors; and
said cleaning section further comprises a substantially obliquely arranged second leakage gutter for guiding substantially egg leakage liquid downwardly at the downstream side of said underneath part, substantially underneath at least one corresponding end section of one of said conveyors, which leakage gutter is movable in a corresponding oblique direction between at least,
an egg leakage liquid transferring position for transferring said egg leakage liquid to said egg leakage liquid receptacle, and
a washing position for guiding liquid to said washing liquid receptacle.

An aspect of the invention provides a method for cleaning egg liquid collecting cups, for example utilizing an apparatus according to the invention, the method including:
conveying a plurality of rows of egg liquid collecting cups at a level above a row of egg parts receptacles;
positioning a liquid receiver gutter between said row of receptacles and said liquid collecting cups;
cleaning at least one of the liquid collecting cups, particularly using a substantially downward cleaning liquid flow.

A further embodiment includes: moving the liquid receiving gutter between a first position and a second position. For example, the movement can be a substantially horizontal movement, or a different type of movement. In yet a further, advantageous and more efficient, example, the substantially downward cleaning liquid flow is prevented from reaching at least a first of the receptacles when the gutter is in its first position, wherein the substantially downward cleaning liquid flow reaches the at least first of the receptacles when the gutter is in its second position.

According to a further embodiment, the egg liquid collecting cups are moving during cleaning, wherein for example breaker units are moving in register with the collecting cups at a level above those cups during the cleaning. Those apparatus parts can then be cleansed efficiently and swiftly, during which e.g. one or more shielding gutters may be positioned to prevent cleaning liquid reaching the, or at least a number of the, egg parts receptacles.

Non-limiting examples of the present invention are shown in the drawing, where

BRIEF DESCRIPTION OF THE INVENTION

FIG. 1 highly schematically shows a first cleaning situation, and

Figure 2:
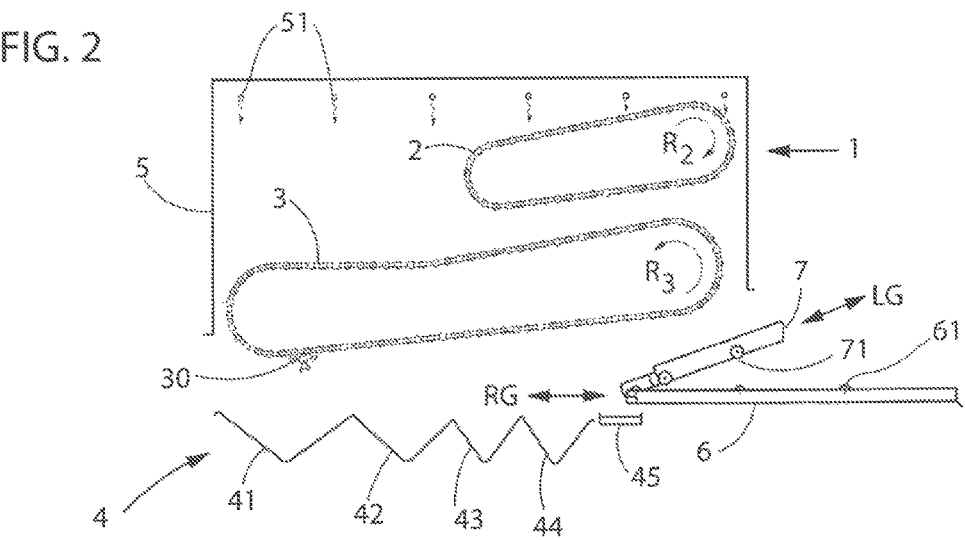

FIG. 2 a suchlike second situation.

DETAILED DESCRIPTION OF THE INVENTION

In the drawings, the same parts of the apparatus are numbered identically.

In FIG. 1 highly schematically and seen from one side a first non-limiting embodiment of the present invention is presented. The system of this embodiment comprises an apparatus for breaking and separating egg liquids thus obtained, having in a sequence of treatment three units 1, 2, 3.

Following the flow of eggs from upstream to downstream, with a first supply unit comprising a endless conveyor 1, eggs are supplied for being processed. As usual such first conveyor or supply conveyor can be a roller conveyor with rollers 10, for example as described in detail in U.S. Pat. No. 5,617,782, incorporated in the present application in its entirety by reference, and referred to therein as 'spool conveyor 3'. The said downstream direction can be recognized from arrow R1 giving the direction of movement of an endless chain of such a conveyor. It might be clear that other possibilities for supplying eggs can be applied, for example supplying and transferring such eggs with robot grippers. From supply conveyor 1 the eggs are transferred one by one from said rollers 10 to a second endless conveyor 2 with breaker units 20, also described in U.S. Pat. No. 5,617,782 as referred to above. For this conveyor 2 said downstream direction is given by an arrow R2.

From said conveyor 2 immediately after breaking egg liquids, mainly albumen and yolk, are received from their downward flow out of the breaker units into receiving carriers or cups 30 (one being shown) of an endless cup conveyor 3 for collecting said liquid from said broken eggs, said breaking units 20 being positioned one by one just above such cups 30. Also such conveyor is well known, for example from the same description as mentioned above. The direction of movement for this conveyor 3 is given by an arrow R3.

As can be seen from this FIG. 1 the movements and dimensions of the second and third conveyors 2, 3 are such that at least during receiving the liquids from the second conveyor into the cups 30 of the third conveyor the position are so-called 'in register'. This means that in a predetermined way their positions are optimally set the above the other. Thus both albumen and yolk are received in said corresponding cups 30, consequently having an optimal separation.

From said carriers or cups 30 all liquid is collected in receptacles 30 underneath. As well known in this field of technology different sequences of collecting said liquids are applied.

For example in the above-mentioned U.S. Pat. No. 5,617,782, in the downstream direction, four subsequent receptacles are applied, the first (numbered 12) for so-called 'rejected egg', the second (numbered 13) for so-called 'whole egg', the third (numbered (14) for white, and the fourth or latter one (numbered 14) for yolk. Such 'whole egg' and 'rejected egg' typifications are well known to those skilled in the art.

In the set-up of the embodiment of FIG. 1 a row 4 of four receptacles 41-44 has been shown, with in the downstream sequence the particular ones 41, 42, 43, and 44. More in particular the downstream sequence as applied, corresponds with, receptacle 41 for albumen, receptacle 42 for 'whole egg', receptacle 43 for yolk, and receptacle 44 for cleaning liquid.

Further to the above, a cleaning section is shown, comprising a housing 5 and cleaning fluid supply elements 51. In most cases such housing is covering a large part of such apparatus. More in particular elements 51 are positioned in the upper part of housing 5, however many further positions can be applied. A downward flow of liquid or fluid as droplets or streams can be generated by the cleaning unit/ cleaning system. However, in case of using sprinkler like heads and orifices a starting up flow may result. The substantially downward flow is schematically indicated with fin the drawings.

As regards said supply elements 51 is in many cases horizontally positioned tubes provided with orifices are applied. Thus large parts of said conveyors can be sprayed and cleaned. More in particular such supply elements can be arranged at more height positions than shown, for example between the loops of the conveyors or within the loops of said conveyors. For a skilled person it might be clear as well that all kind of control are possible. Such control unit is shown in the FIGURES but may combine all kind of combinations of cleaning as regards supply elements, temperatures, liquid compositions, etc.

Furthermore many other possibilities for cleaning can be applied, as well known in this field of technology.

All kind of cleaning liquids can be applied, as well known in this field of technology.

In most cases water mixed with suitable detergent supplements is applied whereas varying water temperatures or liquid temperatures may be comprised as well.

As a further part of this cleaning section 5 a receiver gutter 6 is shown, arranged in between conveyor 3 and the row 4 of receptacles 41-44. The position for the gutter in this FIG. 1 is called the 'cleaning position'. Such gutter 6 is collecting the above mentioned droplets and stream, for further release or for recycling.

In FIG. 1—cleaning position both conveyors 2, 3 can be cleaned whereas the receptacles are protected against leakage of cleaning liquid. Preferably, the apparatus is still operating, performing and moving, however having for example one or two cycles for said conveyors 2, 3 without eggs and without albumen and yolk (for example, supply from the supply conveyor may be temporarily halted during the cleaning operation).

As show in this FIG. 1 said receiver gutter 6 can move back and forth in a substantially horizontal direction, shown with an arrow RG. In the embodiment shown such moving is obtained by a combination of wheels 61 moving over a rail (not shown).

However many other ways of guiding and moving can be applied. Also this moving can be controlled by said control unit which should be considered a central control unit.

In the FIGS. 1 and 2 a further leakage white receptacle 45 is shown, downstream of the other ones 41-44. Said receptacle 45 is arranged underneath the end sections of the conveyors 2, 3, it is to say underneath the region where the transfer of liquid from the breaker units of conveyor 2 to the cups 30 of conveyor 3 starts. It will be clear that in that region residuals of mainly liquid will drip downwardly. Also those residuals can be used economically, and thus are valuable to collect. In this field of technology such residuals are often called 'leakage whites' or 'technical whites'.

In order to collect such 'whites' suitably a further (second) leakage gutter 7 is comprised in the embodiment shown. From the FIGURES it might be clear that for this embodiment this gutter 7 is moving by means of a wheel—rail combination with wheels 71, whereas the direction of movement is indicated with LG.

In FIG. 1 showing the situation for overall cleaning the gutter 7 has taken a position (a "first" position) where all cleaning liquid is guided towards receptacle 44 for cleaning liquid.

In FIG. 2 a suchlike view on the apparatus of the invention is shown, however having the gutter 6 moved from the FIG. 1 position to a downstream (second) position thereby not anymore covering all the receptacles 41-44. This position can be called an operating position. For leakage gutter 7 also a retracted position is shown thus having the function of guiding the above-mentioned 'whites' to said leakage white receptacle 45.

In view of the above it will be clear to a skilled person that all kind of combinations of employing supply units and positioning said gutters are possible. Thus many intermediate positions can be applied, for example dependent on occasional pollution asking for a quick and adapted cleaning service. Thus, during operations, only one or some of the receptacles will be cleaned.

The present invention is not limited to the described embodiments. The skilled person will appreciate that various modifications are possible within the scope of the invention as is defined by claims.

For example, the apparatus can include one or more liquid shields or receiver gutters, to temporarily prevent the cleaning liquid reaching the egg part receptacles. The shield or gutter can be movable in various directions, for example substantially horizontally, and/or it can be configured to be swiveled or rotated between various operating positions (e.g. a said first and second position), or in a different manner.

The invention claimed is:

1. A method for cleaning egg liquid collecting cups, utilizing an apparatus comprising a first supply unit for supplying a plurality of rows of eggs to a second unit comprising a first endless conveyor, said first endless conveyor comprising a plurality of corresponding rows of egg breaker units wherein the eggs are transferred one by one from said supply unit to said egg breaker units of the first conveyor, a second endless conveyor for conveying a plurality of corresponding rows of egg liquid collecting cups, with at least a part underneath said first conveyor for liquids being transferred from said first conveyor to said second conveyor, wherein said breaker units and said cups move in register, a row of egg parts receptacles underneath said cups for collecting at least said liquids, including albumen, yolk, and whole egg liquid, when said second conveyor is moving over said row, and a cleaning section for cleaning said cups, wherein said cleaning section comprises, a liquid washer head in order to clean and wash at least said cups and said receptacles with a substantially downward cleaning liquid flow, a liquid receiver gutter at a height between said row of receptacles and said second conveyor and wherein said gutter can move between at least: a first position or a cleaning position for cleaning at least said cups wherein said receiver gutter is protecting said row of receptacles from leaking said cleaning liquid during said breaking and said separating, and a second position or intermediate position for cleaning at least said cups and at least one of said receptacles wherein said receiver gutter is protecting the remaining receptacles from leaking said cleaning liquid during said breaking and separating, and a control unit for controlling at least movements of said receiver gutter, the method including:
   conveying the plurality of rows of egg liquid collecting cups at a level above the row of egg parts receptacles;
   positioning the liquid receiver gutter between said row of receptacles and said liquid collecting cups; and
   cleaning at least one of the liquid collecting cups, using a substantially downward cleaning liquid flow.

2. The method according to claim 1, wherein the egg liquid collecting cups are moving during cleaning, wherein the breaker units are moving in register with the collecting cups at a level above those cups during the cleaning.

3. The method according to claim 1, further including: moving the liquid receiving gutter between the first position and the second position.

4. The method according to claim 3, wherein the movement is horizontal movement.

5. The method according to claim 3, wherein the substantially downward cleaning liquid flow is prevented from reaching at least a first of the receptacles when the gutter is in its first position, wherein the substantially downward cleaning liquid flow reaches the at least first of the receptacles when the gutter is in its second position.

6. Apparatus for breaking eggs and separating egg liquids thus obtained, comprising in a sequence of treatment,
   a first supply unit for supplying a plurality of rows of eggs to a second unit comprising a first endless conveyor,
   said first endless conveyor comprising a plurality of corresponding rows of egg breaker units wherein the eggs are transferred one by one from said supply unit to said egg breaker units of the first conveyor,
   a second endless conveyor for conveying a plurality of corresponding rows of egg liquid collecting cups, with at least a part underneath said first conveyor for liquids being transferred from said first conveyor to said second conveyor, wherein said breaker units and said cups move in register,
   a row of egg parts receptacles underneath said cups for collecting at least said liquids, including albumen, yolk, and whole egg liquid, when said second conveyor is moving over said row, and
   a cleaning section for cleaning said cups,
wherein,
said cleaning section comprises,
   a liquid washer head in order to clean and wash at least said cups and said receptacles with a substantially downward cleaning liquid flow,
   a liquid receiver gutter at a height between said row of receptacles and said second conveyor and wherein said gutter can move between at least:
      a first position or a cleaning position for cleaning at least said cups wherein said receiver gutter is protecting said row of receptacles from leaking said cleaning liquid during said breaking and said separating, and
      a second position or intermediate position for cleaning at least said cups and at least one of said receptacles wherein said receiver gutter is protecting the remaining receptacles from leaking said cleaning liquid during said breaking and separating, and a control unit for controlling at least movements of said receiver gutter.

7. The apparatus in accordance with claim 6, wherein said washer head comprises a plurality of cleaning liquid supply elements wherein said supply elements are powered by said control unit.

8. The apparatus in accordance with claim 6, wherein said receiver gutter is moveable substantially horizontally.

9. The apparatus in accordance with claim 6, wherein said second conveyor is an endless conveyor having the cups underneath when releasing said liquids.

10. The apparatus in accordance with claim 6, wherein said receiver gutter has a direction of moving from said first position to said second position which is the downstream direction of the third second conveyor.

11. The apparatus in accordance with claim 6, wherein said apparatus further comprises a further downstream washing liquid receptacle for catching and receiving washing liquid after washing with said downward flow when washing at least said second conveyor at its downstream side.

12. The apparatus in accordance with claim 6, wherein said apparatus further comprises a further downstream egg leakage liquid receptacle for collecting egg leakage liquid leaking downwardly from at least a corresponding end section of one of said conveyors.

13. The apparatus in accordance with claim 6, wherein said cleaning section further comprises an obliquely arranged second leakage gutter for guiding egg leakage liquid downwardly at the downstream side of said underneath part, underneath at least one corresponding end section of one of said conveyors, which leakage gutter is movable in a corresponding oblique direction between at least, an egg leakage liquid transferring position for transferring said egg leakage liquid to said egg leakage liquid receptacle, and a washing position for guiding liquid to said washing liquid receptacle.

* * * * *